UNITED STATES PATENT OFFICE.

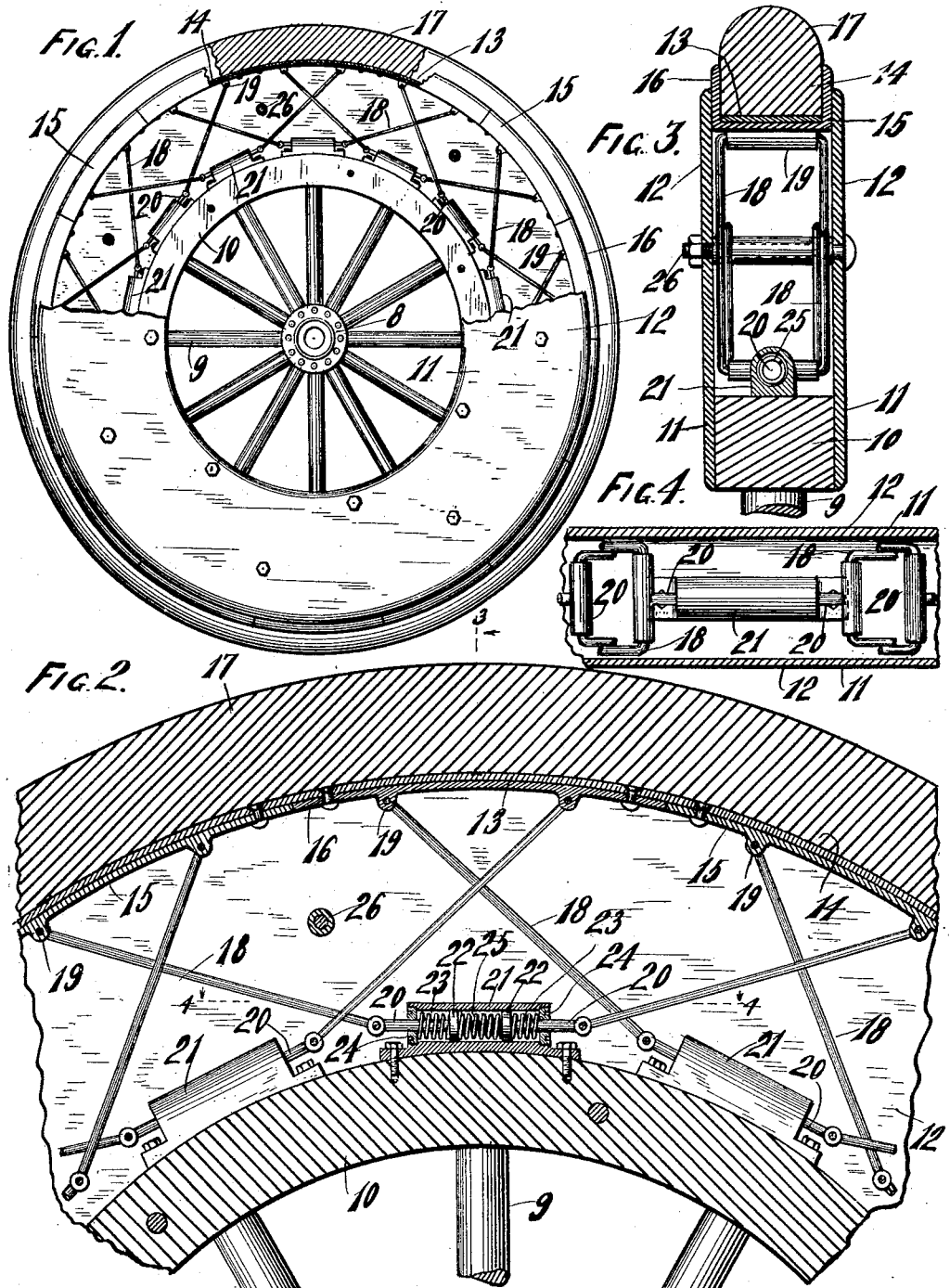

HERMAN E. VOBACH, OF LYNDON STATION, WISCONSIN.

VEHICLE-WHEEL.

1,119,129.  Specification of Letters Patent.  Patented Dec. 1, 1914.

Application filed September 24, 1913. Serial No. 791,481.

*To all whom it may concern:*

Be it known that I, HERMAN E. VOBACH, a citizen of the United States, and resident of Lyndon Station, in the county of Juneau and State of Wisconsin, have invented new and useful Improvements in Vehicle-Wheels, of which the following is a description, reference being had to the accompanying drawings, which are a part of this specification.

This invention relates to improvements in vehicle wheels more particularly adapted for automobile and other vehicle use which require means for absorbing or eliminating shocks due to riding over rough or uneven roads.

It is one of the objects of the present invention to provide a vehicle wheel having a rim portion possessing the resilience and other desirable qualities of a wheel provided with a pneumatic tire.

A further object of the invention is to provide a vehicle wheel with yielding connections between the outer rim and the wheel proper which will eliminate or absorb vibration and also properly support the load.

A further object of the invention is to provide a vehicle wheel in which the side plates are easily removable to replace interior parts in the event of repairs being necessary.

A further object of the invention is to provide a vehicle wheel of the character described which is of simple construction and may be manufactured at a minimum cost.

With the above and other objects in view, the invention consists of the improved vehicle wheel and its parts and combinations as set forth in the claims, and all equivalents thereof.

In the accompanying drawing in which the same reference characters indicate the same parts in all of the views: Figure 1 is a side view of the improved vehicle wheel, parts being broken away to illustrate interior construction; Fig. 2 is a fragmentary sectional view on a larger scale of a portion of the wheel; Fig. 3 is a transverse sectional view taken on line 3—3 of Fig. 2; and Fig. 4 is a fragmentary sectional view taken on line 4—4 of Fig. 2.

Referring to the drawing the numeral 8 indicates the hub, 9 the spokes and 10 the inner rim of the wheel which are all firmly connected together. The side portions of the inner rim have bolted on opposite sides thereof side ring plates 11, which project radially from the rim and form circumferential side flanges 12 for said rim. An outer band 13 positioned within the channels 14 of segmental channeled members 15 and riveted thereto forms the outer non-flexible rim 16 of the wheel which is yieldingly connected to the inner rim. A solid rubber tire 17 is also positioned within circumferential channel or groove 14 and forms the tread of the wheel.

The outer rim 16 is yieldingly connected to the inner rim 10 by rectangular links 18 which are pivoted to eyed portions 19 of the segmental members 15 and to yielding eyed plunger rods 20 carried by the inner rim 10. The plunger rods 20 are slidably mounted within tubular holders 21 in pairs and diverge outwardly from each other and are connected to the segmental members positioned radially between holders from which the rods extend. The segmental members and the tubular holders are so positioned with relation to each other and the links are of such length that the outer ends of links of one tubular holder are diverged to such an extent as to connect with alternate segmental members. The inner ends of the plunger rods are provided with heads 22 and coiled springs 23 surrounding the rods and interposed between the heads and holder ends 24 serve to yieldingly hold the rods under tension. Coiled springs 25 interposed between pairs of rods in each holder provide a spring tension in the opposite direction to the first mentioned springs. The side ring plates 11 are also bolted together in spaced relation by means of bolts 26 which pass through the said plates and through metal tubes 27 interposed between the plates. The spring controlled rods and the links form a yielding connection between the inner and outer rims and provide for absorbing the shocks and bumps due to the inequalities of the road.

From the foregoing description it will be seen that the vehicle wheel is of simple construction and is well adapted for the purpose described.

What I claim as my invention is:

1. A vehicle wheel, comprising an inner rim portion forming part of a wheel, an outer non-flexible rim portion surrounding the inner rim and spaced therefrom, slidable members yieldingly connected to the inner rim and to each other, and U-shaped links pivotally connected in pairs to the slidable members and having a pivotal connection with the outer rim to yieldingly connect the two rims together, said links diverging outwardly from the inner rim and crossing portions of adjacent links.

2. A vehicle wheel, comprising an inner rim portion forming part of a wheel, side plates connected thereto and projecting outwardly therefrom to form circumferential flanges, an outer non-flexible rim positioned between the flanges and spaced from the inner rim, tubular members mounted on the inner rim, plunger rods yieldingly extending into the tubular members, and U-shaped links pivotally connected to the plunger rods and the outer rim and diverging from each other in pairs from said inner rim.

3. A vehicle wheel, comprising an inner rim portion forming part of a wheel, side plates connected thereto and projecting outwardly therefrom to form circumferential flanges, an outer rim positioned between the flanges and spaced from the inner rim, tubular members mounted on the inner rim, pairs of plunger rods yieldingly extending into the tubular members, and U-shaped links pivotally connected to the outer ends of the plunger rods and to the outer rim, the links of each tubular member diverging in pairs from each other and crossing the links of adjacent tubular members.

In testimony whereof, I affix my signature, in presence of two witnesses.

HERMAN E. VOBACH.

Witnesses:
C. H. KEENEY,
L. G. THEURER.